(12) United States Patent
Winter (10) Patent No.: US 10,066,371 B2
(45) Date of Patent: Sep. 4, 2018

(54) WEAR PLATES

(71) Applicant: Kent Winter, Willoughby, OH (US)

(72) Inventor: Kent Winter, Willoughby, OH (US)

(73) Assignee: Winter Equipment Company, Willoughby, OH (US)

( * ) Notice: Subject to any disclaimer, the term of this patent is extended or adjusted under 35 U.S.C. 154(b) by 0 days.

(21) Appl. No.: 14/847,928

(22) Filed: Sep. 8, 2015

(65) Prior Publication Data

US 2016/0069047 A1    Mar. 10, 2016

Related U.S. Application Data (60) Provisional application No. 62/046,582, filed on Sep. 5, 2014.

(51) Int. Cl.
*E02F 3/815* (2006.01)
*E02F 9/28* (2006.01)
*B23K 35/24* (2006.01)
*E21B 3/00* (2006.01)

(52) U.S. Cl.
CPC ............ *E02F 9/2883* (2013.01); *B23K 35/24* (2013.01); *E02F 3/8152* (2013.01); *E21C 1/00* (2013.01)

(58) Field of Classification Search
CPC .............................. E02F 3/8152; E02F 9/2833
USPC .......................................... 37/270, 444, 407
See application file for complete search history.

(56) References Cited

U.S. PATENT DOCUMENTS

| 2,336,749 | A | * | 12/1943 | Ratkowski | ................ E02F 3/40 228/137 |
|---|---|---|---|---|---|
| 3,685,177 | A | | 8/1972 | Hahn et al. | |
| 4,290,214 | A | * | 9/1981 | Stepe | .................... E02F 9/2808 172/701.2 |
| 4,315,375 | A | * | 2/1982 | Shinn | ....................... E02F 3/401 172/719 |
| 4,547,985 | A | * | 10/1985 | Silins | ................. B23K 35/0288 172/701.1 |
| 4,756,102 | A | * | 7/1988 | Chapman | .................. E01H 1/04 172/719 |
| 5,148,616 | A | | 9/1992 | Maguina-Larco | |
| 5,553,409 | A | | 9/1996 | Irving | |
| 5,647,448 | A | * | 7/1997 | Skaggs | ................. E02F 9/2866 175/421 |
| 5,724,755 | A | | 3/1998 | Weagley | |
| 5,813,474 | A | * | 9/1998 | Manway | ................ A01B 15/06 172/701.3 |
| 5,954,282 | A | * | 9/1999 | Britzke | ............... B02C 13/1814 241/275 |
| 6,000,117 | A | * | 12/1999 | Bain | ...................... B64C 25/52 228/120 |
| 6,041,529 | A | | 3/2000 | Ruvang | |

(Continued)

FOREIGN PATENT DOCUMENTS

JP    7-310332    * 11/1995
JP    9-88111     *  3/1997

Primary Examiner — Gary S Hartmann
(74) Attorney, Agent, or Firm — Fay Sharpe LLP (57) ABSTRACT

A wear plate for attachment to an excavator bucket. The wear plate comprising a mounting surface for mounting to an exterior face of the excavator bucket. The wear plate having a plurality of holes extending along at least a portion of the wear plate. The holes include carbide matrix weldment therein overfilling the holes. The wear plate comprises a sacrificial and impermanent replaceable wear edge for the exterior faces of the excavator bucket.

12 Claims, 5 Drawing Sheets

(56) References Cited

U.S. PATENT DOCUMENTS

| | | | |
|---|---|---|---|
| 6,799,385 B2* | 10/2004 | Champney | B23K 35/0288 |
| | | | 172/701.3 |
| 6,854,527 B2* | 2/2005 | Manway | E02F 3/8152 |
| | | | 172/701.1 |
| 7,266,914 B2 | 9/2007 | Grant | |
| 7,596,895 B2 | 10/2009 | Jones | |
| 7,836,615 B2 | 11/2010 | Winter | |
| 7,874,085 B1 | 1/2011 | Winter et al. | |
| 7,909,279 B2* | 3/2011 | Condon | B02C 13/1814 |
| | | | 241/275 |
| 8,024,874 B2 | 9/2011 | McClanahan et al. | |
| 8,191,287 B2 | 6/2012 | Winter et al. | |
| 8,209,887 B2* | 7/2012 | Ghosh | E01H 1/00 |
| | | | 37/270 |
| 8,844,173 B2 | 9/2014 | Winter et al. | |
| 9,027,266 B2* | 5/2015 | Maher | E02F 9/285 |
| | | | 37/444 |
| 9,163,379 B2* | 10/2015 | Winter | E01H 5/061 |
| 2009/0101370 A1* | 4/2009 | Tasovski | B60P 1/286 |
| | | | 172/1 |
| 2012/0260537 A1 | 10/2012 | Winter et al. | |
| 2014/0237869 A1* | 8/2014 | Caux | E02F 3/40 |
| | | | 37/444 |
| 2015/0047234 A1 | 2/2015 | Winter | |
| 2015/0191899 A1* | 7/2015 | Jones | E02F 3/40 |
| | | | 37/444 |
| 2016/0069041 A1* | 3/2016 | Winter | E02F 3/8157 |
| | | | 37/453 |

* cited by examiner

FIG. 2

WEAR PLATES

This application claims priority to U.S. Provisional Patent Application No. 62/046,582, filed Sep. 5, 2014, by Kent Winter and entitled "WEAR PLATES" and is incorporated herein by reference in its entirety.

BACKGROUND

In the mining and construction industries, loading and moving of heavy materials such as sand, gravel and rock is often accomplished using heavy machinery such as scoop trams, front-end loaders and powered bucket digging devices. During operation, these buckets tend to wear along their leading and side edges due to abrasion when entering the material pile and during contact with the ground. During use, the leading or lip edges and side edges may tend to wear down, sometimes very quickly. After the lip edges and side edges wear down to a point where the base plate or bucket are threatened with wear, the bucket may typically be removed and sent to be refurbished by replacing the lips or lip edges and side edges. Bucket removal is a relatively common practice in the mining industry at present. Rework and replacement of bucket lips and side edges can be a major undertaking involving burning, cutting and welding. Time may be lost if the loader is transported to a shop where the bucket is to be replaced. In a mining setting, the loader may remain inside the mine, the bucket being cut into two pieces and transported out of the mine to the surface. The replacement bucket may be returned in two pieces and be welded together before being placed on the loader. If a replacement bucket is not available or the replacement process is too cumbersome at the time, an operator may continue operating the loader nonetheless. As a result the base plate or the bucket itself may be damaged through overuse and may then require much more extensive repair than would otherwise be expected. The replacement of the base plate or bucket may well be much more costly than the continued use gained by operating the loader for the extra time.

Alternatively, the mine may keep an inventory of repaired buckets available. It is advantageous to reduce the ratio of buckets in inventory to the number of buckets in use, since buckets held in inventory, or being refurbished, are capital assets that are not earning revenue. Thus, it is advantageous to facilitate relatively simple replacement of wear plates and teeth in the mine, and to reduce the number of major overhauls requiring bucket removal to the surface.

When a loader or underground scoop tram is used for loading or transporting materials it is common to weld a base plate to the lower front edge of the bucket, the welding join line running from side to side across the bucket. The bucket is usually made of mild steel and the base plate is made of a mild steel or high carbon steel. The base plate is sometimes of greater thickness than the bucket plate. The upper surface of the base plate is installed flush with the inner surface of the bucket. The base plate has a lead, provided by leading edges that extend forwardly at an angle from the lower corners of the bucket to converge at a central point or tip. Different leads are selected by different operators to suit specific conditions. It is common for base plates to have leads of six, eight, ten or twelve inches, the lead being the distance that the tip is located forwardly of a line joining the outside corners of the bucket. A number of known scoop tram buckets have widths in the range of 56 to 112 inches, the tangent of the angle of the lead, viewed from above, being the lead dimension divided by the half width of the bucket.

The supply of replaceable wear edge parts and plates for the aforementioned wear areas, namely the forward lips and side edges and adjacent wing leading edges and sides of excavating or loader buckets, or similar, is the subject of this application; as well as a system of standardization that includes the supply and installation of universal, removable, and replaceable, wing, lip, and side edge wear segments.

Loader buckets currently come in a variety of sizes. The present supplies of lip and side edge wear components, to meet the numerous different bucket leads, involve producing and stocking a wide variety of wear segments. As a result, many different sizes of lips and side edges may be manufactured and stocked to meet demand. This results in a need to maintain a relatively large inventory.

Replaceable and weldable, leading edge wear shroud kits have been used in the past, but have tended to include elements as much as 40 inches wide or more. Such a part may weigh three hundred pounds or more. In general, the greater the weight of the part, the more difficult it is to handle, whether by hand or by machine, whether in shipping, transferring from one form of transport to another, installation and/or removal.

In addition, the mating faces of the aforementioned parts may not be planar, and may not be aligned with the forward and rearward direction of the bucket. Where the mating interfaces are arcuate, curved, or splayed, it may not be possible to remove each part without first removing another neighboring part. The other part may not require replacement. This may complicate the occasional replacement of a single broken part, and may make general replacement of wear segments more time consuming than it need be. It would be advantageous to tend to avoid this complication by making the sides of adjoining segments straight and aligned, and preferably generally running in the fore-and-aft direction, to permit a segment to be slid into place between its neighbors. Although larger segments can be used, it would be advantageous to employ plates or segments that are in the range of 3 inches to 12 inches wide, and 6 inches to 6 feet long. Similarly, it would be advantageous to keep the weight of each wear segment, or as many of them as practicable, below about 80 lbs., and preferably below about 50 lbs. It would also be preferable to be able to remove any individual plate or segment without having to remove others first. That is, it would be advantageous to employ wear plates or segments that do not require a specific order of removal and installation.

It would be a further advantage, to adopt a wear plate or wear bar system involving relatively few components, and relatively simple installation methods such as may be made in place (i.e. on site) with only minor lifting devices and readily available welding tools (i.e. oxy-acetylene torches). Another option is to sell one size, or a relatively small number of sizes, of wear plates or bars that can be trimmed or cut by the user in the field to match the bucket size. In this manner, the wear parts or bars can be sold like lumber and cut to size at the job site.

The effectiveness of a loader is determined by the number of loads per hour that can be loaded for a given material. Currently, lips and side edges for attachment to base plates have wedge shaped or rectangular profiles. These profiles may not be conducive to easy rolling of muck or other materials into the bucket. As a result, the effectiveness of the loader is reduced as muck gets caught on the lips and side edges or if the muck is slow to roll off the lips and side edges into the bucket. It may be advantageous to have lips and side edges with profiles that tend to encourage rolling motion in the muck. It may also be advantageous to have a side edge profile in which accumulation of muck or other materials is deterred, or where accumulation is directed to certain areas.

It would be advantageous to be able to trim or cut a cast or forged part to a customizable size for installation in the field. It would also be advantageous if the shape and profile of the side edges were designed to encourage a rolling action in the material to be loaded and to minimize wear/abrasion to the wear part. It would also be advantageous to use a method for providing lips and side edges which reduces inventory variety and inventory costs while still supporting a wide variety of bucket widths and side edge configurations.

Accordingly, there is a need for new lips and side edges (i.e. front and sides) wear parts and a new method for providing and mounting such lip and side edge wear parts, and other wear parts.

BRIEF DESCRIPTION

In one aspect of the invention, there is a set of wear plates, bars, sections, or segments developed to incorporate advantages over a number of existing systems. The wear sections can be cut and welded in place and are sized for relatively easy handling and installation. In a method aspect of the present invention, this may tend to permit replacement in place at the worksite location in the field, preferably without the use of heavy machinery or the bodily removal of a bucket, and without the need for plasma cutter torches.

In another aspect or feature of the invention, standardization of wear components to a limited number of sizes as required to meet a plurality of bucket sizes, may tend to reduce inventory stocking difficulties. In another feature of the invention, there can be a relatively small number of sizes of wear segments from which a selection of combinations and permutations will permit kits to be assembled to fit a relatively large number of bucket sizes. In an additional feature, wear segments of differing thicknesses can be provided to suit differing thicknesses of sides and base plates as chosen by operators according to bucket capacity and operating conditions. In another feature of the present invention, the weld-on segments can be relatively easily installed in place without the use of heavy equipment and with only the use of wry-acetylene torches or similar.

In still yet another additional feature, the wear plates or segments can include an upper surface extending rearwardly from the tip of the wear segment. The upper surface can include a plurality of spaced and raised nodules or plugs to encourage rolling action into and out of work material. In a further additional feature, the bucket can have a height in the range of 10 to 60 inches, and the leading edge of the base plate can be chosen from an inventory of segments consisting of segments of less than 9 inches in width.

In still a further additional feature, the bucket has a height in the range of 10 to 60 inches, and the wear segments for the sides are chosen from an inventory of wear segments including wear segments of at least two widths. In yet a further additional feature, at least two widths are chosen from an inventory of wear segments of up to four widths selected from a set of exemplary widths comprising (a) about 4 inches; (b) about 6 inches; (c) about 8 inches; and (d) about 10 inches.

In still yet another additional feature, the wear segment has a thickness measured between the first and second parallel planes, and the nodules have a depth, wherein the thickness being about the same as the depth.

In a further additional feature, the wear segment can have a thickness measured between the first and second parallel surfaces, and the nodules can have a depth, wherein the depth being greater than the thickness.

In still a further arrangement, the wear segment can have a thickness, and the nodules can have a depth, wherein the depth being less than the thickness.

BRIEF DESCRIPTION OF THE DRAWINGS

For a better understanding of the present invention and to show more clearly how it may be carried into effect, reference will now be made by way of example to the accompanying drawings, which show a wear plate according to an embodiment of the present invention and in which.

DETAILED DESCRIPTION

The description that follows, and the embodiments described hereinafter, are provided by way of examples of particular embodiments of the principals of the present invention. These examples are provided by the purposes of illustration, and not of limitation, of those principals and of the invention. In the description that follows, like parts are marked throughout the specification and drawings with the same respective numerals. The drawings are not necessarily to scale and in some instances proportions may have been exaggerated in order to more clearly depict certain features of the invention. In this description the terms "leading" or "forward" refer to the direction of advance of the equipment into a work substance, be it earth, or gravel, or rock, or some other substance.

Figure 5:
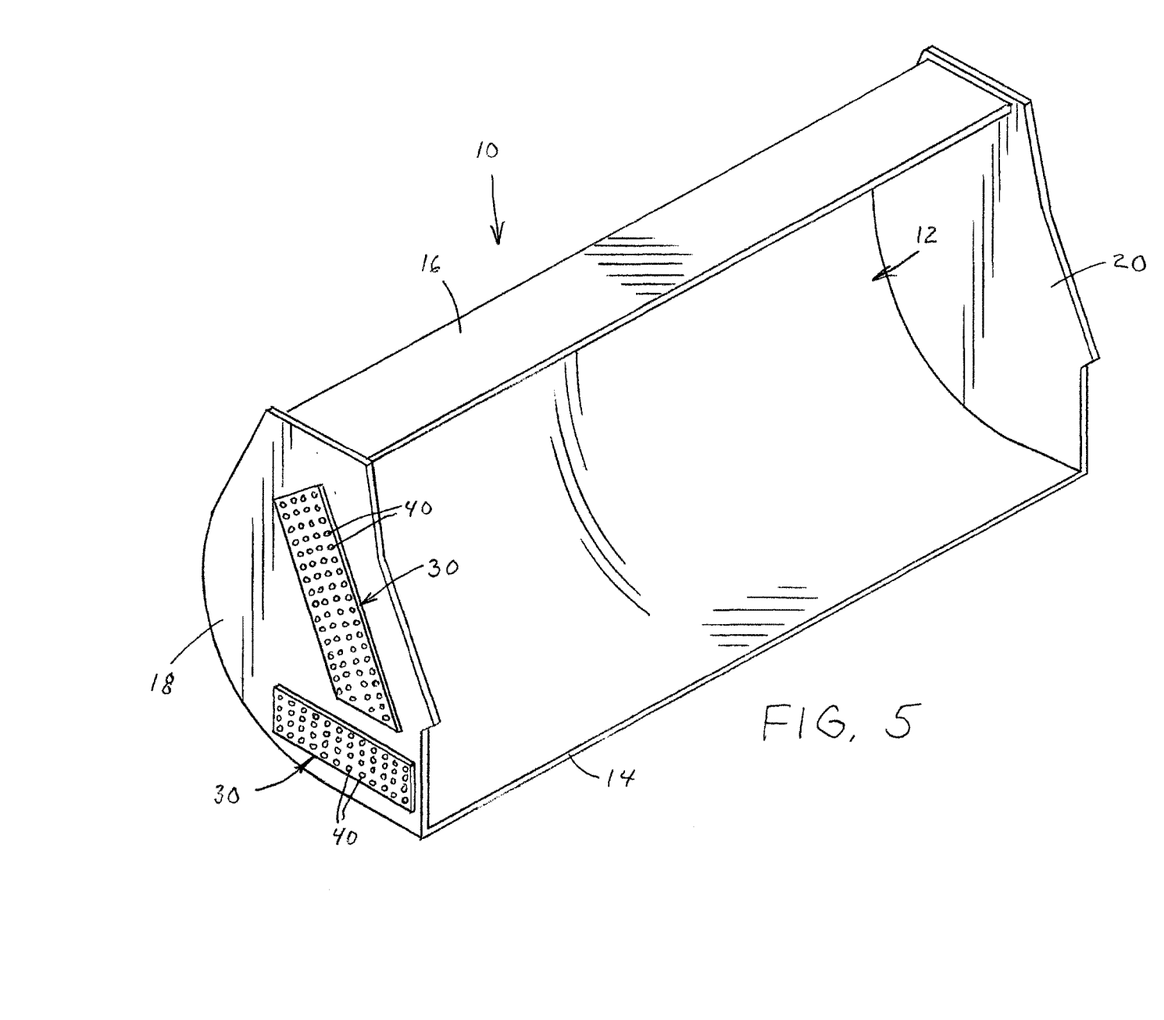

By way of general overview, FIG. 5 shows an exemplary view of a bucket 10 of a front end loader having wear components or wear plates 30 installed thereon. The bucket 10 has a backshell assembly that can be in the form of a generally rectangular plate 12 formed on a curve of constant radius, terminating in a leading, or lower tangential plate portion 14 that forms the base wall of the bucket, and another planar portion 16 that forms the upper edge of the bucket. The curved backshell assembly is bounded at either end by left and right end walls 18, 20. The end walls 18, 20 and backshell assembly cooperate to define the scoop area of the bucket 10.

The bucket 10 is shown with a plurality of wear components or wear plates 30 tack welded along the outside of the end wall 18. The wear plates 30 are shown in a rectilinear geometry but can comprise any desired shape or geometry.

The bucket 10, when installed on a tram scoop (not shown) or front end loader (not shown), is raised or lowered by means of external mechanism, such as a boom assembly (not shown) which carries the weight of the bucket through pivot assemblies mounted at the main pivot points (not shown). The bucket 10 can be rotated about these points through some angular range of motion. Typically, the angular orientation of the bucket 10 relative to the booms upon on which it is mounted is controlled by means of one or more hydraulic cylinders, which can be exemplified by a centrally located powered cylinder in the nature of a hydraulic ram (not shown). The hydraulic ram can have one end connected to the boom assembly, and another end connected to a rearwardly oriented portion of the bucket exterior offset by a moment arm distance from pivot points such that extension or retraction will tend to cause the bucket to pivot. In addition to the bucket mechanisms, translational forward and rearward motion of the front end loader to force the bucket into a pile of material when excavating or digging is provided by the front end loaders engine and drive train.

As shown in the figures, each of the wear plates or bars 30 can include a plurality of holes 32 drilled from an outside face 34. The holes 32 can be filled and/or over filled with a carbide matrix deposit 40. When overfilled, the deposits 40 can take on the configuration of a "muffin top" or nodule over the respective holes 32. It is to be appreciated that any number of wear plates 30 can be mounted to either side 18, 20 or bottom edge of the bucket 10. The wear plates 30 can be cut, using an oxy-acetylene torch, in order to reduce the size and/or to custom fit around preexisting mounts, pivot points, or other non-planar mechanisms protruding from the exterior of the bucket 10. The holes 32 drilled into the wear plate 30 can also include a small through hole or pilot hole 33 extending all the way through the wear plate 30. These through holes 33 can act as exhaust ports during the filling of the holes 32 with the carbide matrix deposit 40. The depositing of the carbide matrix 40 can be referred to as "plug welds". Each wear plate, and/or portions of wear plates, can be welded to the exterior surfaces of the bucket 10 in any orientation or position that accommodates the exterior geometry of respective buckets. It is to be appreciated that the present invention can be used on any number of different types and manufacturers of buckets and that the wear plates 30 can be cut to size and/or mounted in association with a plurality of wear plates 30 to meet the desired coverage of the wear surfaces. It is to be appreciated that the thicknesses t of the wear plates 30, inclusive of nodules 40, can come in a variety of dimensions for meeting particular applications.

In use, substrate material (i.e. excavation or mining substrate material) will adhere to the area 50 between the overfilled deposits. Eventually nearly all of the area 50 between the deposits or nodules 40 will comprise substrate material with the plugs 40 acting as "footers". Further use will involve the anchored substrate material in abrasive contact with the substrate material being excavated (i.e. "substratum material against substratum material"). This in turn will reduce wear on the plugs 40 and prolong the life of the wear plates 30 and associated bucket 10 (for example). The combined surface area of the weld deposits 40 can be from about 30% to about 70% of the surface area of face 34 of the wear plate 30.

Figure 1:
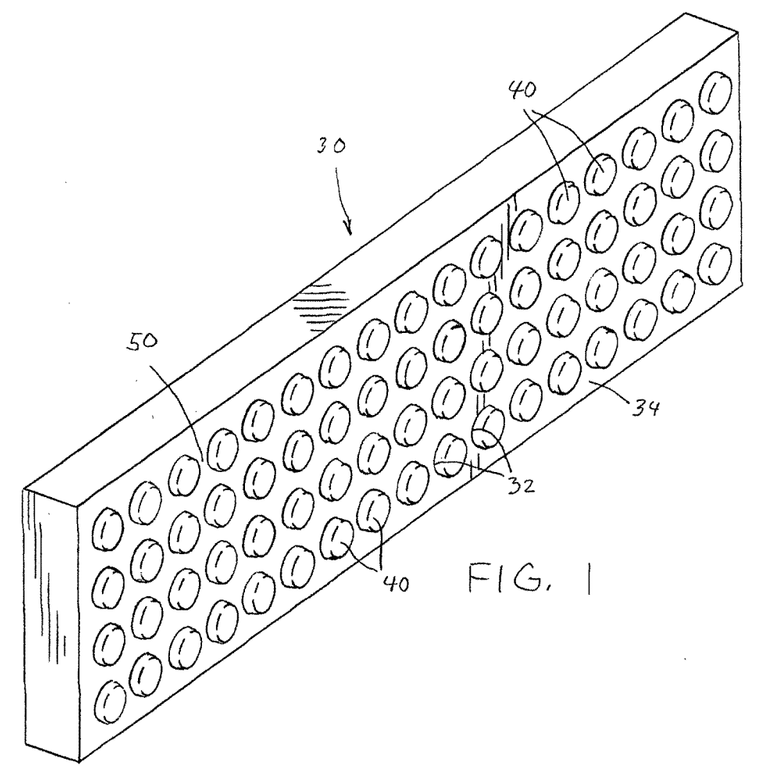
FIG. 1 is a perspective view of the wear plate.
Figure 2:
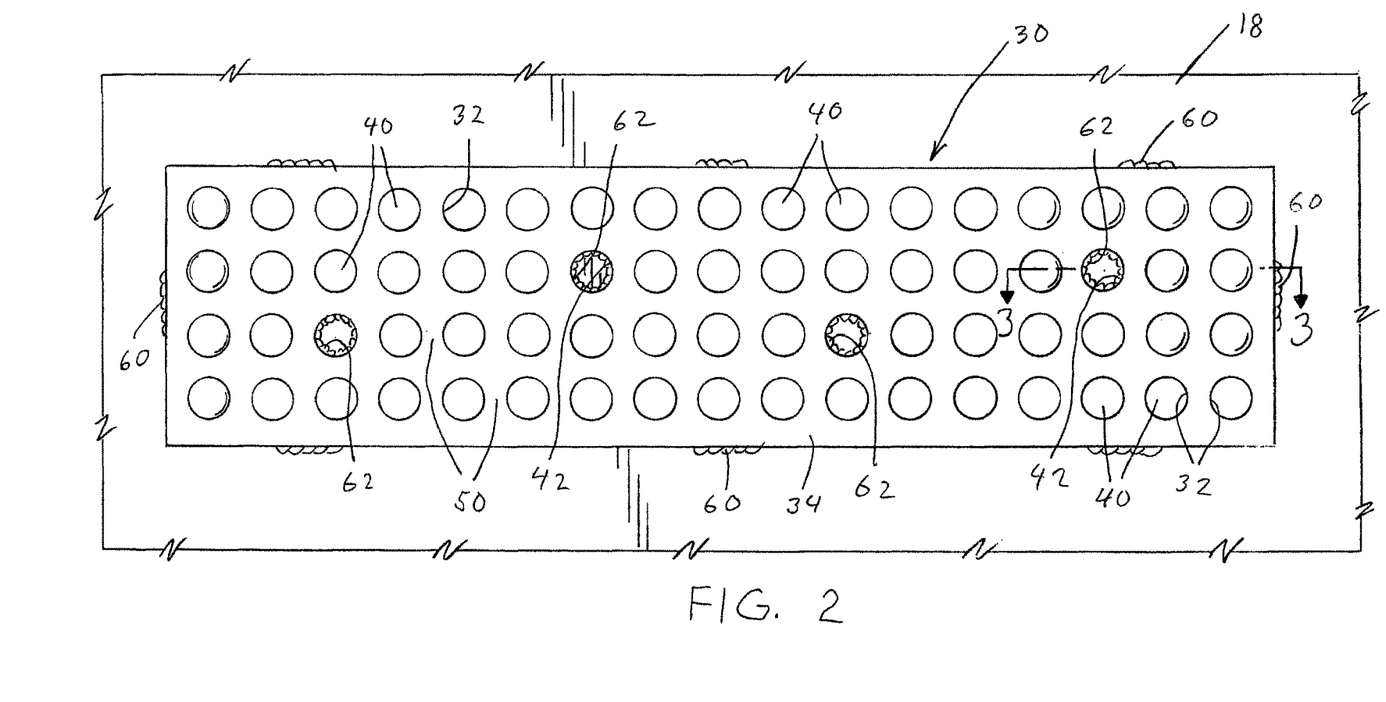
FIG. 2 is a plan view of a wear plate mounted to a work surface.
Figure 3:
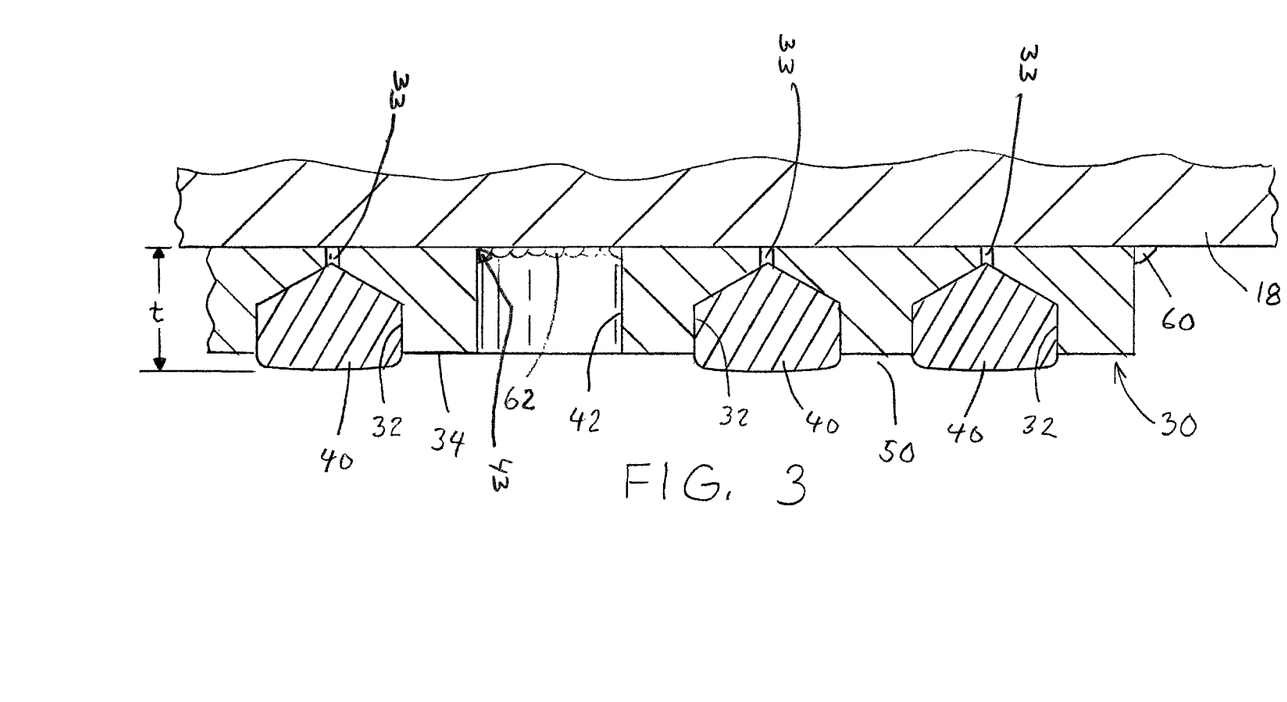
FIG. 3 is a cross sectional view of a portion of the wear plate taken along line 3-3 in FIG. 2.

In addition, the wear plates 30 can include a plurality of relatively larger through holes 42 to accommodate welding inside the perimeter of the through holes 42 for mounting of the wear plates 30 to the sides and/or bottom edges of the bucket 10. In this manner, the wear plates 30 can include not only tack or fillet welds 60 around the exterior perimeter of the wear plate 30, but can also include slot or fillet welds 62 within the perimeter of the through holes 42. At a joint 43 between the wear plate 30 and the end wall 18. This method of mounting will provide a plurality of secure welds 60 to the sides and/or bottom edges of the bucket, while also providing protection to, and shielding from abrasion, some of the fillet or slot welds 62 as the bucket 10 is used during operation (FIG. 3). It is to be appreciated that the internal slot welds 62 are shielded from wear and abrasion.

It is to be appreciated that the wear plates 30 can come in any number of variable widths, sizes, and lengths. The wear plates 30 can be combined and used in conjunction with a plurality of other wear plates 30 for particular applications. In this manner, not only can any number of wear plates 30 be used during initial mounting, but as individual wear plates 30 show relative increased wear, individual wear plates 30 can be replaced as needed Wear plates 30 can be affixed to any portion of bucket 10 by welding 60, 62 or other rigid mounting means. The edges of wear plates 30 can be pre-machined with a chamfer (not shown). The chamfer can extend around the full perimeter of the wear plate.

Figure 4:
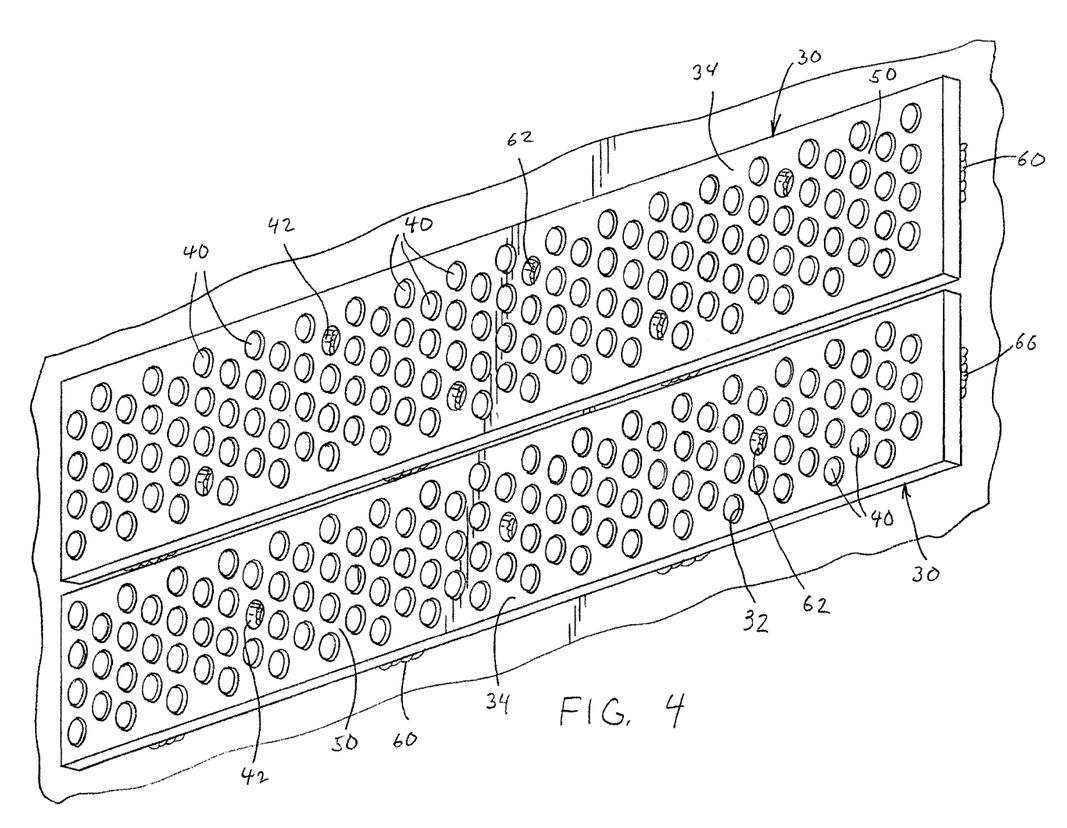
FIG. 4 is a perspective view of a pair of wear plates in an exemplary mounted orientation; and, FIG. 5 is an exemplary orientation of a plurality of wear plates mounted on a bucket.

The array of wear segments 30, indicated in FIGS. 4 and 5, can comprise any number of wear plates or portions of wear plates. The wear plates 30 can be cut to any size or geometrical shape to accommodate the particular mounting arrangement. The wear plates 30 can have a varying thickness (i.e. a uniformly tapering plane) to accommodate a sloping mounting surface.

As there are a variety of sizes of buckets, different sizes of lip and side edge wear segments are required. There are over two dozen standard widths of loader buckets in use in industry today. Thus, it has been determined that having an easily handled width and length of lip and side edge wear segments (or portions thereof) can be variously combined to yield plate sets or kits suitable for use with nearly all different standard size loader buckets. The use of a few standard lip and side edge wear segment sizes will reduce manufacturing costs, shipping costs and inventory costs as well as serve a wide variety of bucket sizes.

In operation, the loader forces bucket 10 into a material pile such as earth or ore and lifts bucket 10 upwards. The material rolls along lip and side edge wear segments. The curvature of the nodules 40 in lip and side edge wear segments 30 tends to allow for more efficient rolling motion of the bucket 10 into and out of the material.

Wear plate segments 30 are subject to wear during use. After some time an operator or maintenance technician, may observe that the nodules 40 have worn to such an extent that insufficient material is left for further use. Individual wear plates 30 can then be selectively replaced.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A wear plate for attachment to an associated excavator bucket including a backshell and a pair of opposed end walls mounted thereto, said end walls being spaced from each other a distance defining a width of said associated excavator bucket, the wear plate comprising:

a mounting surface for mounting to an exterior face of at least one of said end walls; and a first plurality of holes spaced around at least a portion of said wear plate, said holes include carbide matrix weldment deposits therein overfilling said holes and enhancing a rolling motion of said associated excavator bucket, wherein said holes further include exhaust ports extending through said wear plate;

said wear plate being a sacrificial impermanent replaceable wear edge for the exterior faces of said end walls.

2. The wear plate as recited in claim 1, further comprising:
a second plurality of holes extending through said wear plate creating a series of openings and joints between said wear plate and said associated excavator bucket; and,
said joint includes a fillet weld for attaching said wear plate to said associated excavator bucket.

3. The wear plate as recited in claim 2, wherein said the wear plate is selectively and independently replaceable.

4. The wear plate as recited in claim 3, wherein said wear segment includes a thickness and said weldment deposits include a depth; and,
said thickness being generally the same as said depth.

5. The wear plate as recited in claim 3, wherein said wear segment includes a thickness and said weldment deposits include a depth; and,
said thickness being greater than said depth.

6. A wear plate for attachment to an associated excavator bucket comprising:
said wear plate including a mounting surface for mounting to an exterior face of the associated excavator bucket;
said wear plate having a first plurality of holes including carbide matrix weldment deposits therein overfilling said holes;
said wear plate having a second plurality of holes extending through said wear plate creating a series of openings and joints between said wear plate and said bucket, the second plurality of holes creating internal slot welds for shielding the associated excavator bucket from wear and abrasion; and,
said wear plate comprises a sacrificial replaceable wear edge for the exterior face of the associated excavator bucket.

7. The wear plate as recited in claim 6, further comprising:
said joint includes a fillet weld for attaching said wear plate to said bucket.

8. The wear plate as recited in claim 7, wherein the wear plate is selectively and independently replaceable.

9. The wear plate as recited in claim 6, wherein said wear segment includes a thickness and said weldment deposits include a depth; and,
said thickness being generally the same as said depth.

10. The wear plate as recited in claim 6, wherein said wear segment includes a thickness and said weldment deposits include a depth; and,
said thickness being greater than said depth.

11. The wear plate as recited in claim 6, wherein said first holes further include exhaust ports extending through said wear plate.

12. A wear plate configured for attachment to an associated excavator bucket, the wear plate comprising:
a plurality of holes drilled from an outside face of the wear plate, the outside face for abrasive contact with a substrate material being excavated;
each hole including a pilot hole extending through the wear plate;
a carbide matrix deposit filling the each hole; and
a plurality of through holes operative to receive fillet welds within a perimeter of the through holes for attaching the wear plate to the associated excavator bucket.

\* \* \* \* \*